// 
US007120450B2

United States Patent
Hines et al.

(10) Patent No.: US 7,120,450 B2
(45) Date of Patent: *Oct. 10, 2006

(54) CONSEQUENTIAL LOCATION DERIVED INFORMATION

(75) Inventors: Gordon John Hines, Kirkland, WA (US); Will Cousins, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 314 days.

This patent is subject to a terminal disclaimer.

(21) Appl. No.: 10/400,639

(22) Filed: Mar. 28, 2003

(65) Prior Publication Data

US 2004/0023667 A1 Feb. 5, 2004

Related U.S. Application Data

(60) Provisional application No. 60/367,708, filed on Mar. 28, 2002, provisional application No. 60/367,709, filed on Mar. 28, 2002.

(51) Int. Cl.
*H04Q 7/20* (2006.01)
*H04M 11/00* (2006.01)
*H04M 1/66* (2006.01)

(52) U.S. Cl. .............................. 455/456.1; 455/404.2; 455/414.2

(58) Field of Classification Search .. 455/456.1–456.3, 455/457, 11.1, 410, 411, 404.2, 414.2; 342/357.01, 342/357.06, 357.09, 357.13
See application file for complete search history.

(56) References Cited

U.S. PATENT DOCUMENTS

| 5,432,841 | A | * | 7/1995 | Rimer ........................ 455/457 |
| 5,835,907 | A | * | 11/1998 | Newman ..................... 707/10 |
| 6,104,931 | A | * | 8/2000 | Havinis et al. .......... 455/456.5 |
| 6,138,003 | A | * | 10/2000 | Kingdon et al. ............ 455/410 |
| 6,185,427 | B1 | * | 2/2001 | Krasner et al. .......... 455/456.2 |
| 6,377,810 | B1 | * | 4/2002 | Geiger et al. ............ 455/456.2 |
| 6,553,236 | B1 | * | 4/2003 | Dunko et al. ............... 455/457 |
| 6,618,593 | B1 | * | 9/2003 | Drutman et al. ......... 455/456.3 |
| 6,757,545 | B1 | * | 6/2004 | Nowak et al. ........... 455/456.2 |
| 6,775,255 | B1 | * | 8/2004 | Roy .......................... 370/331 |
| 6,885,874 | B1 | * | 4/2005 | Grube et al. ................ 455/520 |
| 2002/0098832 | A1 | * | 7/2002 | Fleischer et al. ........... 455/414 |
| 2002/0138650 | A1 | * | 9/2002 | Yamamoto et al. ......... 709/245 |
| 2004/0185875 | A1 | * | 9/2004 | Diacakis et al. ......... 455/456.3 |

* cited by examiner

*Primary Examiner*—Benny Quoc Tieu

(57) ABSTRACT

The number of messages required in networks where location services are deployed may be reduced, by providing updated location information regarding particular subscribers, or even all subscribers, to subscribed or otherwise logged applications or services upon obtaining and providing location information for a different application or service. Consequential watch services in accordance with the principles of the present invention provide location information to one or more services OTHER than or in ADDITION to the service currently requesting location information, based on subscription to a suitable service.

22 Claims, 4 Drawing Sheets

Consequential Watch Table

| Subscriber | Consequential Location Updates to also be provided to : |
|---|---|
| (555) 555-1212 | Application 2<br>Application 3 |
| (111) 111- 5555 | Application 2 |
| ⋮ | ⋮ |

← 301

← 303

305

CONSEQUENTIAL LOCATION DERIVED INFORMATION

This application claims priority from co-pending U.S. application Ser. No. 60/367,708, entitled "Location Derived Presence Information", filed Mar. 28, 2002, to Hines et al.; U.S. application Ser. No. 60/367,709, entitled "Consequential Location Services", filed Mar. 28, 2002, to Hines et al.; and U.S. application Ser. No. 10/395,217, entitled "Location Derived Presence Information", filed Mar. 25, 2003, to Hines, et al., the entirety of all three of which are explicitly incorporated herein by reference.

BACKGROUND OF THE INVENTION

1. Field of the Invention

This invention relates generally to wireless communication carriers. More particularly, it relates to location-based services for the wireless industry.

2. Background of Related Art

Location information regarding subscribers is increasingly becoming available in a wireless network. This is particularly true in systems that comply with E-9-1-1 requirements. Location information relates to absolute coordinates of a wireless device.

Both Location and Presence services are message intensive on telecom networks. Message reduction in general is desirable, both to allow increased capacity in a wireless network, as well as to improve reliability of the system by reducing the number of messages.

FIG. 4 shows a conventional LoCation Services (LCS) request.

In particular, as shown in FIG. 4, a location server 106 requests location information regarding a particular mobile subscriber (MS) from a core network node, e.g., from a Mobile Switch Center (MSC) 110. Requested information regarding a particular wireless device (MS) may include, e.g., attach, detach, and location area update. The location server 106 may also request information regarding the wireless device such as attach, detach and/or location area update from a Packet Date Node (e.g., SGSN, GGSN, or PDSN), or help the device calculate x/y direction.

Typically, location information regarding a particular wireless device is requested of a home location register (HLR).

As shown in step 1 of FIG. 4, a locations services client sends a message to a location server.

In step 2, a location server 106 sends a Provide Subscriber Info message to a Home Location Register 108, requesting subscriber information regarding a particular subscriber.

In step 3, the carrier's Home Location Register (HLR) 108 provides the subscriber information for the requested subscriber back to the location server 106.

In step 4, location information regarding the requested subscriber is requested to either an MSC or Packet Data node 110. The MSC or Packet Data Node preferably provides precise location information using, e.g., a global positioning satellite (GPS), triangulation techniques, or other relevant locating technology, or helps the device calculate X/Y direction.

In step 5, the location request is forwarded to the Radio Access Network (RAN) 112 if needed.

In step 6, precise, updated location information regarding the requested subscriber is sent to the location server (LS) 106.

In step 7, an ultimate response to the original location request is sent to the LCS client 104 that initially requested the location information.

Others have proposed watching or monitoring locations of subscribers in a wireless network by "polling". The conventional polling technique utilizes a system within the wireless network to request updated location information relating to all provisioned subscribers. The polling is performed periodically, e.g., every N minutes.

However, polling is disadvantageous in that it is very resource intensive making it a costly solution for the business use cases it supports.

SUMMARY OF THE INVENTION

In accordance with the principles of the present invention, a method and apparatus provides presence and location information regarding a wireless device. Applications register with the system they are interested in presence and/or location information consequentially. A request for presence or location information is received by a potentially unrelated application, either through a direct request or as a polled request. The information is retrieved through standard practices and replied to the caller. As a consequence of the original presence or location request, the resultant information is also returned to the register applications. This greatly reduces the load placed on the wireless network since the registered applications received updated information without directly requesting the information.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
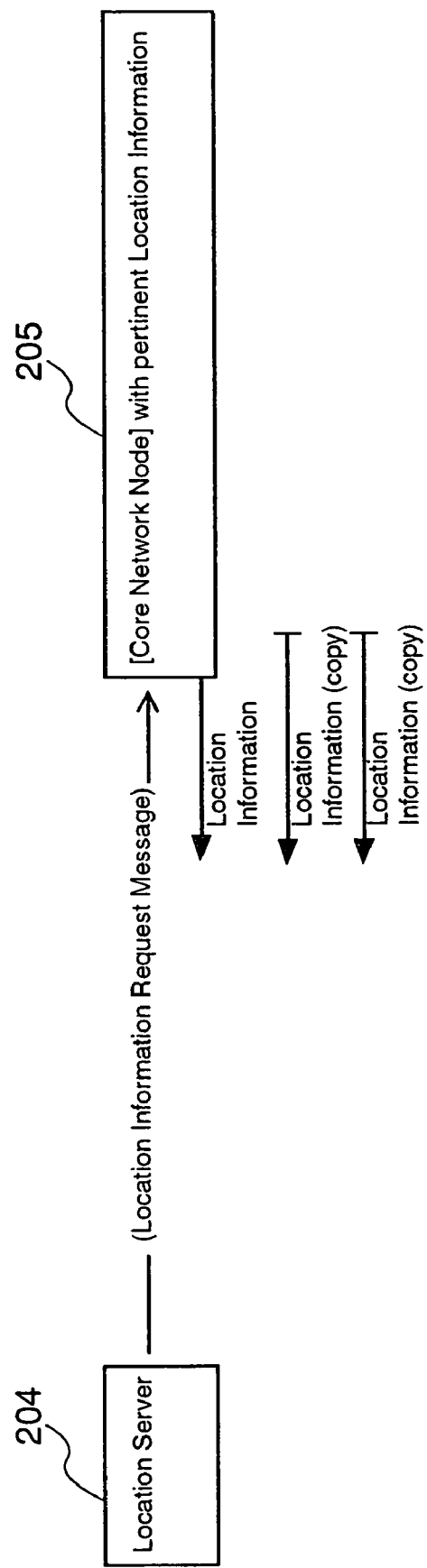
FIG. 1 shows generally a location request.

The present invention reduces the number of messages required in networks where location-based services are deployed.

Consequential Watch services in accordance with the principles of the present invention provides location information to one or more services OTHER than or in ADDITION to the service currently requesting location information, based on subscription to a suitable service, referred to herein as, a consequential watch application. Of course, a suitable service may have any name other than consequential watch yet perform the same or similar function(s) as does the described consequential watch.

In the disclosed embodiments, a consequential watch service notifies one or more OTHER applications other than the particular application responsible for a latest location request, whenever location information for a particular subscriber is updated. A consequential watch application allows the avoidance of polling of subscribers for latest location information, and instead replaces polling as in conventional wireless systems with a monitoring and reporting service that reports to relevant applications that have previously requested monitoring service for the particular subscriber(s), even though those applications were not currently responsible for an update to the relevant subscriber's location information.

Thus, the disclosed consequential watch application notifies other applications or services, e.g., upon a request for update of a mobile subscriber's position, state, preferences or feature set, as a consequence of another service requesting location information (thus updating the location database at, e.g., a Location Server (LS)). Note that the other applications or services are not necessarily notified only when the particular subscriber changes location: but rather as a consequence of a different application or service requesting updated location information regarding that particular subscriber.

The present invention solves fundamental disadvantages of conventional wireless systems regarding location reporting. For instance, conventional wireless networks including a location-based service update location information on a scheduled, regular basis, i.e., using polling. However, polling of every single mobile subscriber in a mobile network is extremely resource intensive.

For example, if a mobile network has 10,000,000 subscribers, and a mere 5% of those 10,000,000 subscribers, or 500,000 actually use a location service requiring location tracking of their handset, the entire network would be subjected to location tracking. With 5-minute updating of each wireless device in the network this translates into a need to support 1,667 transactions per second. This puts a strain on the wireless network, and consumes valuable data bandwidth in the communications.

In accordance with a consequential watch system in accordance with the principles of the present invention, various applications or services will, from time to time, request an update of the location of a particular subscriber anyway. A consequential watch application reduces this redundancy by allowing entities in communication with the wireless network to subscribe to a consequential watch service wherein when a particular user's location information is updated in the Location Server (LS), then applications or services requesting location information upon update of that particular subscriber will also receive relevant, updated location information regarding the same wireless user.

The subscriber to the consequential watch service may be inside or outside the carrier's network.

For example, presume a wireless subscriber with a phone number, e.g., (206) 390-9150 is subscribed to, e.g., Starbucks Promotions, Yahoo! Messaging, & The Battle in Seattle (a multi-player mobile game), and that wireless subscriber (206) 390-9150 dials #777 to ask for the nearest Bank of America ATM, the location data update made for #777 will be pushed to the other three applications as a consequence of the #777 request and the functionality of the consequential watch.

FIG. 1 shows generally a location request to a core network node containing pertinent location information, resulting not only in a return of location information, but also in the spawning of presence information.

In particular, as shown in FIG. 1, a location server 204 requests location information regarding a particular mobile subscriber (MS) from a core network node 205, e.g., from a Mobile Switch Center (MSC). Requested information regarding a particular wireless device (MS) may include, e.g., attach, detach, and location area update. The location server 204 may also request information regarding the wireless device such as attach, detach and/or location area update from a Packet Date Node (e.g., SGSN, GGSN, or PDSN). The location server 204 may alternatively (or additionally) obtain location information directly from an appropriately equipped wireless device (e.g., a wireless device including a global positioning satellite (GPS) receiver.

Typically, location information regarding a particular wireless device is requested of a home location register (HLR). In accordance with the principles of the present invention, the home location register can also serve as a basis for presence services. Exemplary presence services may include, e.g., the state and/or status of a subscriber.

Importantly, in accordance with the present invention, information relating to an initial location request spawns or triggers the provision of additional location request information messages to subscribers to a consequential watch application or service.

Figure 2:
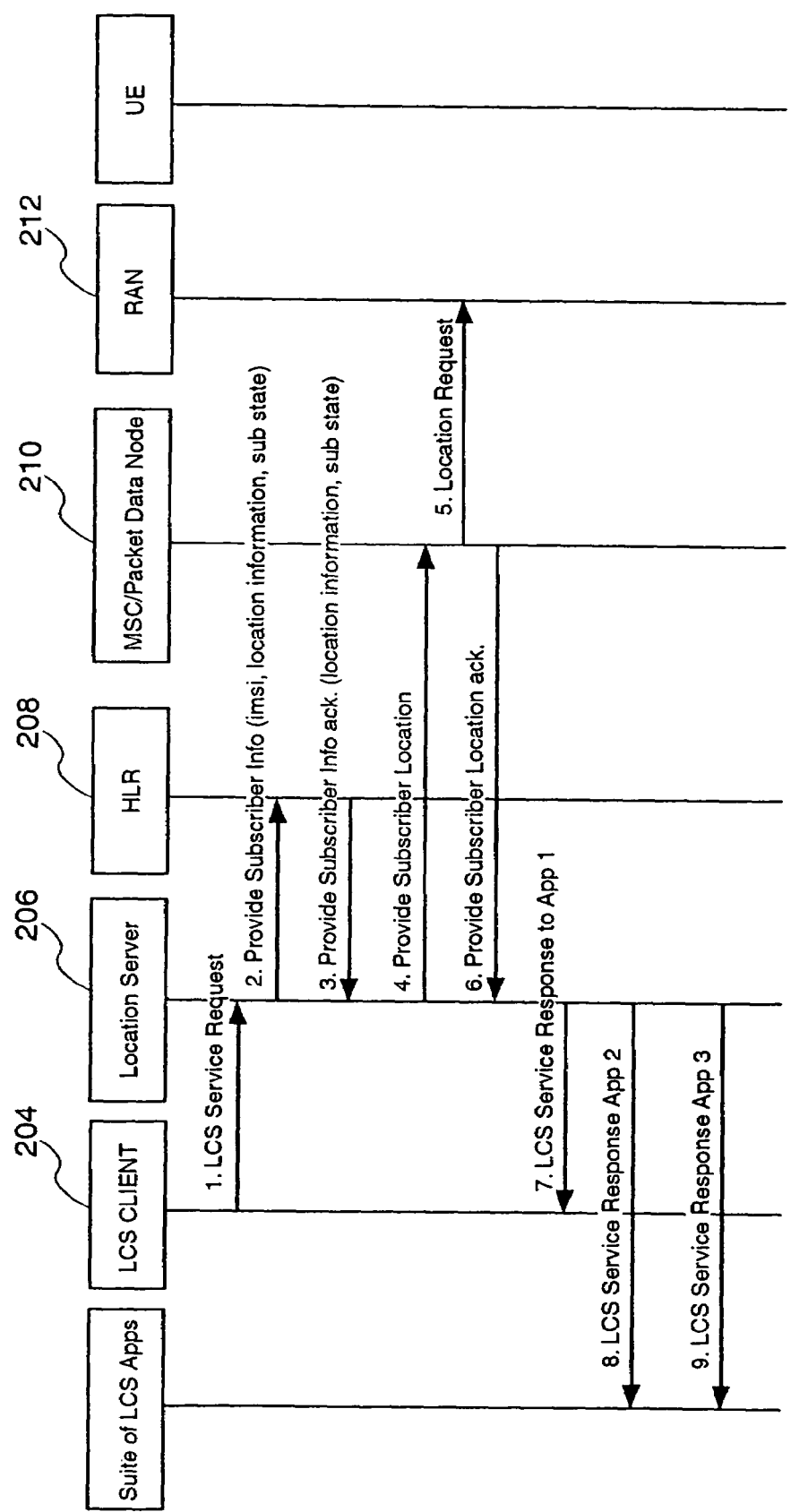
FIG. 2 shows an exemplary message flow of a LoCation Services (LCS) request, including a consequential watch application or service, in accordance with the principles of the present invention.

FIG. 2 shows an exemplary message flow of a LoCation Services (LCS) request between a location service client 204, a location server 206, a home location register (HLR) 208, a core network node such as an MSC or packet data node 210, and a radio access node (RAN) 212, including a consequential watch application or service located, e.g., in the location server 206, in accordance with the principles of the present invention. While the consequential watch application is located herein in association with a location server 206, the consequential watch application may be located in any suitable element sufficient to cause the provision of multiple location information messages in response to a single request.

In the exemplary embodiment, the messaging cycle is initiated (shown in step 1) by a location services client 204, that transmits a location request message to a location services server 206 in the relevant carrier's network.

In step 2, a location server 206 sends a Provide Subscriber Info message to a Home Location Register 208 (or other node containing subscriber identity information) regarding a particular subscriber. The Provide Subscriber Info message can request location information and/or subscriber state. In this use case, location information regarding a particular subscriber is requested, and within the same message, presence information such as subscriber state may also be requested. Requested presence information can include, e.g., idle, bust, not reachable, etc.

In step 3, the network node containing the location information (e.g., the carrier's Home Location Register (HLR) 208) provides the requested subscriber information for the requested subscriber back to the location server 206.

In step 4, the location services server 206 requests information regarding the relevant wireless user by message to either an MSC or Packet Data node 210. The MSC or Packet Data Node preferably provides precise location information using, e.g., a global positioning satellite (GPS), triangulation techniques, or other relevant locating technology. Alternatively, precise location information may be obtained from an appropriately equipped wireless device (e.g., a wireless device including a GPS receiver).

In step 5, the MSC or packet data node 210 requests updated location information of the wireless network, i.e., sending a request for current location information from a relevant node or application of the wireless network (e.g., from the Radio Access Network (RAN) 212).

The MSC, packet data node 110, Radio Access Network 212, etc. may determine a current location of the relevant wireless device using any suitable location technology, e.g., using a global positioning satellite (GPS) system, using triangulation, using angle of arrival, etc.

As part of the determination of a current location of the wireless device, as shown in Step 5, the location request may be forwarded to the relevant Radio Access Network 212. This would be necessary for certain locating technologies, e.g., for triangulation, angle of arrival, etc.) If a global positioning satellite system is utilized, the location request may be forwarded to a suitable GPS application in the wireless network that receives GPS location information regarding a relevant wireless device.

In step 6, a response to the update location information request including precise, updated location information regarding the requested subscriber is transmitted to the location services server (LS) 206. (The updated location information may also be forwarded to the HLR (not shown in FIG. 2) to update the current location of the relevant wireless device).

In step 7, an ultimate response to the original location request is sent to the LCS client 204 that initially requested the location information. This location information ideally includes current location information freshly obtained from the MSC 210 or other network node, but may instead be cached location information stored in the HLR 208 if the location information is not returned within a sufficient time window (e.g., causing a timeout). This would be the end of an otherwise conventional location request. However, the invention importantly continues on. In some applications, if desired, the process may end in the event of a timeout. However, the consequential provision of location information to subscribed other applications or services may be provided even in the event of a timeout waiting for new location information.

Step 8 particularly shows the advantages of a consequential location application or service, in accordance with the principles of the present invention.

In particular, in accordance with important principles of the present invention, although location information has already been provided to a requesting application or service, the same location information is also provided to one or more additional applications or services that have previously requested such information in the event of somebody else requesting information regarding the particular subscriber.

This 'freebie' location information is an important aspect of the present invention. For instance, an entirely separate application or service may register with a particular carrier for a consequential location service, perhaps by paying suitable fees, for the right to receive location information for those wireless devices that otherwise have location information retrieved. This avoids the need for the location server 206 to separately handle additional requests from each separate application desiring location information regarding the same subscriber(s).

Figure 3:
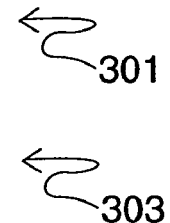
FIG. 3 shows an exemplary consequential watch table, in accordance with the principles of the present invention.
Figure 4:
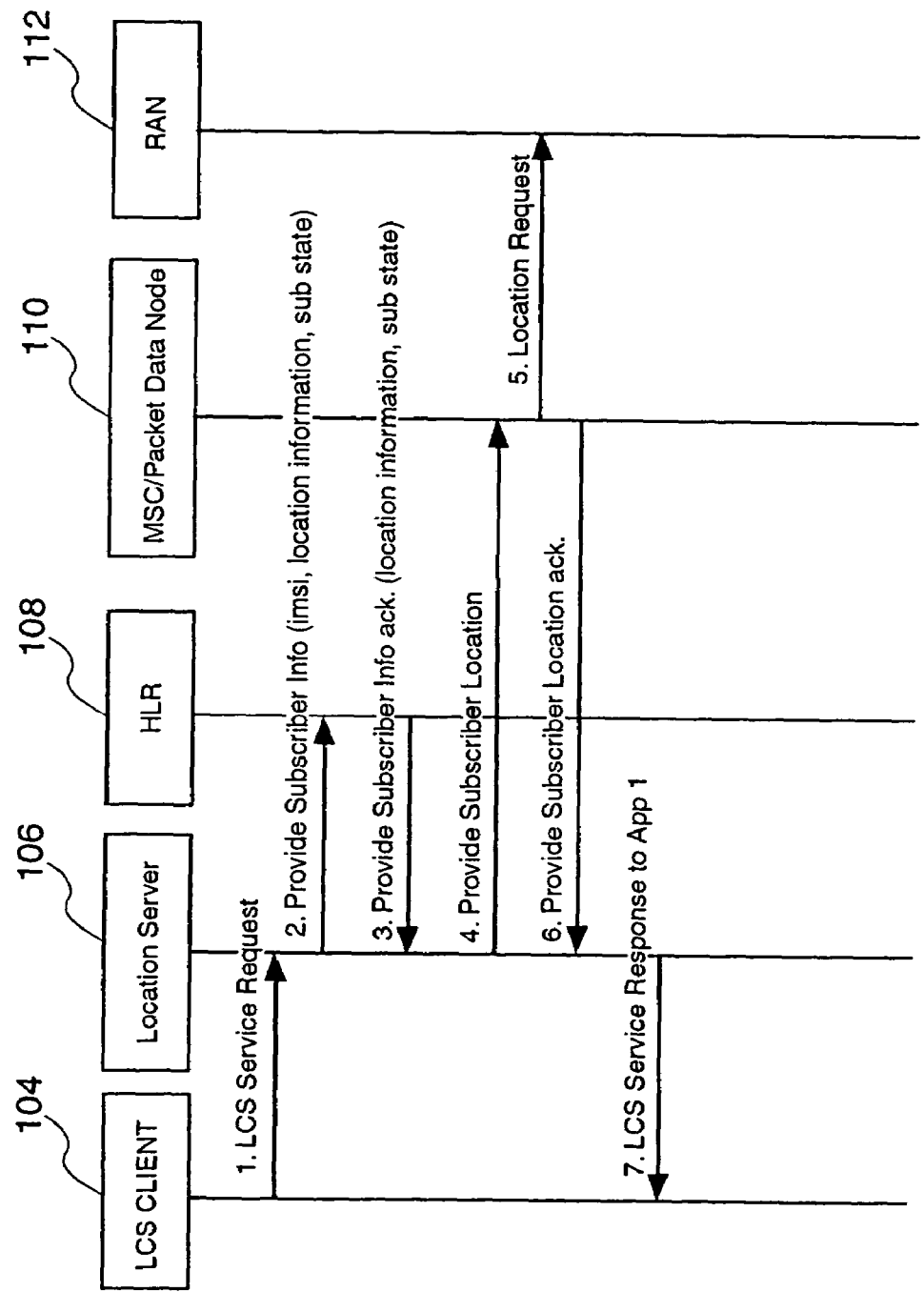
FIG. 4 shows a conventional LoCation Services (LCS) request.

FIG. 3 shows an exemplary consequential watch table 305, in accordance with the principles of the present invention.

In particular, FIG. 3 shows just one possible table associating unique subscriber identities (e.g., phone numbers) with one or more applications or services that desire to be provided with location information whenever the location information is already being provided to a different application or service.

FIG. 3 shows just two entries 301, 303 associating unique subscriber identities with applications or services subscribed to consequential watch services. Thus, application or services subscribing to a consequential watch service receives location information, avoiding the need for multiple messages otherwise required to update the same application with location information.

Applications or services may also be provided location updates by default, whenever location information regarding anyone in a particular subscriber group, or fitting particular aspects of subscribers, is provided.

As an example of consequential watch services, presume that Application 2 and Application 3 subscribe to a consequential watch service of a particular wireless carrier, as shown in FIG. 3. According to this example, the consequential watch is set up such that anytime the location of a particular subscriber (e.g., Subscriber (111) 111-5555) is updated in the location server (LS), Application 2 would be notified of the updated location by the relevant consequential watch application in addition to the initial requestor of the location information. Also according to this example, the consequential watch is further set up such that anytime the location of subscriber (555) 555-1212 is requested and provided by a location server, the same updated location information will also be provided to Application 2 and Application 3 without any further intervention or requests necessary by either Application 2 or Application 3.

Steps 8 and 9 show this latest example where location information, provided in response to a location request from one application, is also provided to Application 2 (Step 8) and also to Application 3 (Step 9).

The present invention provides benefits such as reducing core network messaging traffic, thus providing better system performance.

While the invention has been described with reference to the exemplary embodiments thereof, those skilled in the art will be able to make various modifications to the described embodiments of the invention without departing from the true spirit and scope of the invention.

What is claimed is:

1. A method of providing information regarding a wireless device, comprising:
   receiving a request for location information regarding a wireless device;
   determining a pre-registered non-requesting application being are-registered with a central location distribution point distinct from said wireless device; and
   providing location information regarding said wireless device to both a requesting application and said pre-registered non-requesting application from said central location distribution point, in response to said receipt of said request for location information regarding said wireless device.

2. The method of providing location information regarding a wireless device according to claim 1, wherein:
   said location information is provided to at least two different applications separate from an application requesting said location information.

3. The method of providing location information regarding a wireless device according to claim 1, wherein:
   said location information is maintained in a home location register.

4. The method of providing location information regarding a wireless device according to claim 1, further comprising:
   requesting current location information regarding said wireless device from a core network node.

5. The method of providing location information regarding a wireless device according to claim 4, wherein said core network node comprises:
   a message service center.

6. The method of providing location information regarding a wireless device according to claim 1, further comprising:

obtaining last known location information regarding said wireless device to return as said location information.

7. The method of providing location information regarding a wireless device according to claim 1, wherein:
said location information is obtained from cached memory.

8. The method of providing location information regarding a wireless device according to claim 1, wherein:
said location information is obtained from a radio access network.

9. The method of providing location information regarding a wireless device according to claim 1, wherein:
said location information is obtained from a global positioning satellite (GPS) system.

10. The method of providing location information regarding a wireless device according to claim 1, wherein:
said location information is obtained from a network trigger generated in response to said wireless device moving from a first cell-site to a second cell-site.

11. The method of providing location information regarding a wireless device according to claim 1, wherein:
said location information is freshly determined.

12. Apparatus for providing information regarding a wireless device, comprising:
means for receiving a request for location information regarding a wireless device;
means for determining a pre-registered non-requesting application being pre-registered with a central location distribution point distinct from said wireless device; and
means for providing, in response to said receipt of said request for location information regarding said wireless device, location information regarding said wireless device to both a requesting application and said pre-registered non-requesting application from said central location distribution point.

13. The apparatus for providing location information regarding a wireless device according to claim 12, wherein:
said means for providing location information provides said location information to at least two different applications separate from an application requesting said location information.

14. The apparatus for providing location information regarding a wireless device according to claim 12, wherein:
said location information is maintained in a home location register.

15. The apparatus for providing location information regarding a wireless device according to claim 12, further comprising:
means for requesting current location information regarding said wireless device from a core network node.

16. The apparatus for providing location information regarding a wireless device according to claim 15, wherein said core network node comprises:
a message service center.

17. The apparatus for providing location information regarding a wireless device according to claim 12, further comprising:
means for obtaining last known location information regarding said wireless device to return as said location information.

18. The apparatus for providing location information regarding a wireless device according to claim 12, wherein:
said means for providing location information obtains said location information from cached memory.

19. The apparatus for providing location information regarding a wireless device according to claim 12, wherein:
said means for providing location information obtains said location information from a radio access network.

20. The apparatus for providing location information regarding a wireless device according to claim 12, wherein:
said means for providing location information obtains said location information from a global positioning satellite (GPS) system.

21. The apparatus for providing location information regarding a wireless device according to claim 12, wherein:
said means for providing location information obtains said location information from a network trigger generated in response to said wireless device moving from a first cell-site to a second cell-site.

22. The apparatus for providing location information regarding a wireless device according to claim 12, wherein:
said location information is freshly determined.

* * * * *

UNITED STATES PATENT AND TRADEMARK OFFICE
CERTIFICATE OF CORRECTION

| | | |
|---|---|---|
| PATENT NO. | : 7,120,450 B2 | Page 1 of 1 |
| APPLICATION NO. | : 10/400639 | |
| DATED | : October 10, 2006 | |
| INVENTOR(S) | : Hines et al. | |

It is certified that error appears in the above-identified patent and that said Letters Patent is hereby corrected as shown below:

Column 6, Line 39, replace:
"being are-registered with a central location distribution" with
-- being pre-registered with a central location distribution --

Signed and Sealed this
Third Day of January, 2012

David J. Kappos
*Director of the United States Patent and Trademark Office*